US011377125B2

(12) United States Patent
Jeromin et al.

(10) Patent No.: US 11,377,125 B2
(45) Date of Patent: Jul. 5, 2022

(54) VEHICLE RIDESHARE LOCALIZATION AND PASSENGER IDENTIFICATION FOR AUTONOMOUS VEHICLES

(71) Applicant: Rivian IP Holdings, LLC, Plymouth, MI (US)

(72) Inventors: Oliver Jeromin, Plymourh, MI (US); Kiran Bharwani, Plymouth, MI (US); Aziz Umit Batur, Plymouth, MI (US); Patrick Hunt, Evanston, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 16/917,440

(22) Filed: Jun. 30, 2020

(65) Prior Publication Data

US 2021/0403055 A1    Dec. 30, 2021

(51) Int. Cl.
| | |
|---|---|
| *B60W 60/00* | (2020.01) |
| *B60W 40/08* | (2012.01) |
| *G01S 19/42* | (2010.01) |
| *G01C 21/34* | (2006.01) |
| *G08G 1/123* | (2006.01) |
| *H04N 7/18* | (2006.01) |

(Continued)

(52) U.S. Cl.
CPC ...... *B60W 60/00253* (2020.02); *B60W 40/08* (2013.01); *G01C 21/3407* (2013.01); *G01S 19/40* (2013.01); *G01S 19/42* (2013.01); *G08G 1/123* (2013.01); *H04N 7/185* (2013.01); *H04W 4/024* (2018.02); *B60W 2420/42* (2013.01); *B60W 2556/45* (2020.02)

(58) Field of Classification Search
CPC .......... B60W 60/00253; B60W 40/08; B60W 2556/45; B60W 2420/42; H04W 4/024; G01C 21/3407; G01S 19/40; G01S 19/42; G08G 1/123; H04N 7/185
See application file for complete search history.

(56) References Cited

U.S. PATENT DOCUMENTS

| | | | | |
|---|---|---|---|---|
| 10,837,788 | B1 * | 11/2020 | Kentley-Klay | .... G01C 21/3623 |
| 2013/0162792 | A1 * | 6/2013 | Lee | .................... G06K 9/00362 |
| | | | | 348/77 |

(Continued)

*Primary Examiner* — Hussein Elchanti
(74) *Attorney, Agent, or Firm* — Clements Bernard Baratta; Christopher L. Bernard (57) ABSTRACT

Various disclosed embodiments include methods of locating an intended passenger of an automotive vehicle and vehicle-based systems for locating an intended passenger of an automotive vehicle. In an illustrative embodiment, a method of locating an intended passenger of an automotive vehicle includes: moving an automotive vehicle to an approximate location of an intended passenger based on a location signal from the intended passenger received via a wireless network; after moving to the approximate location of the intended passenger, receiving, by the vehicle, an image from an electronic device of the intended passenger, the image being an image of the intended passenger or an image of local physical surroundings of the intended passenger; processing the image to determine additional location information of the intended passenger based on matching the image against one or more reference images; and accepting by the vehicle, the intended passenger responsive to the image processing.

20 Claims, 2 Drawing Sheets

(51) Int. Cl.
*H04W 4/024* (2018.01)
*G01S 19/40* (2010.01)

(56) References Cited

U.S. PATENT DOCUMENTS

| | | | |
|---|---|---|---|
| 2014/0039784 A1* | 2/2014 | Millspaugh | G08G 1/202 |
| | | | 701/300 |
| 2016/0378303 A1* | 12/2016 | Crilley | G06T 13/80 |
| | | | 715/733 |
| 2017/0153714 A1* | 6/2017 | Gao | G06K 9/00798 |
| 2020/0202142 A1* | 6/2020 | To | G05D 1/0088 |
| 2021/0092555 A1* | 3/2021 | Mayor | G01C 21/3647 |
| 2021/0150419 A1* | 5/2021 | Drayna | G06Q 50/30 |

* cited by examiner

VEHICLE RIDESHARE LOCALIZATION AND PASSENGER IDENTIFICATION FOR AUTONOMOUS VEHICLES

INTRODUCTION

The present disclosure relates to transportation using autonomous vehicles, and more particularly to systems and methods for pairing autonomous vehicles to their intended passengers.

The statements in this section merely provide background information related to the present disclosure and may not constitute prior art.

Autonomous vehicles are of great interest for transportation applications and can provide benefits to the ride-sharing industry. Conventionally, when an intended passenger makes a request for a ride-sharing vehicle, the intended passenger may have to contact the driver or have human interactions with the driver of the vehicle to identify his/her particular vehicle, especially when in a crowed area such as a city or an airport. Such interaction, however, may be challenging, if even possible, when the passenger is attempting to locate an autonomous vehicle within a pool of autonomous vehicles or a crowded area with obstructions The Society for Automotive Engineers (SAE) has defined five levels of vehicle autonomy, ranging from level 0 (no automation) to level 5 (full automation), that have been adopted by the U.S. National Highway Traffic Safety Administration. For a non-autonomous vehicle (level 0), the driver performs all driving tasks. In a vehicle with level 1-3 autonomy (driver assistance, partial automation, and conditional automation respectively), the driver may need to control the vehicle at certain times, e.g., so as to stop quickly or maneuver to avoid an obstacle. In a vehicle with level 4 autonomy (high automation), the driver's control is optional and as such the driver may rarely interact with the vehicle. In level 5 autonomy (full automation), the driver may not drive the vehicle at all (and in this respect can be considered a passenger).

SUMMARY

Various disclosed embodiments include methods of locating an intended passenger of an automotive vehicle and vehicle-based systems for locating an intended passenger of an automotive vehicle.

In an illustrative embodiment, a method of locating an intended passenger of an automotive vehicle includes: moving an automotive vehicle to an approximate location of an intended passenger based on a location signal from the intended passenger received via a wireless network; after moving to the approximate location of the intended passenger, receiving, by the vehicle, an image from an electronic device of the intended passenger, the image being an image of the intended passenger or an image of local physical surroundings of the intended passenger; processing the image to determine additional location information of the intended passenger based on matching the image against one or more reference images; and accepting by the vehicle, the intended passenger responsive to the image processing.

In another illustrative embodiment, a vehicle-based system for locating an intended passenger of an automotive vehicle includes: a wireless transceiver configured to receive a location signal via a wireless network; an image sensor for acquiring imagery proximate the automotive vehicle; a navigation system for providing guidance for moving the vehicle to an approximate location of the intended passenger based on the location signal; and a computer processing system configured to receive an image from an electronic device of the intended passenger after the vehicle is moved to the approximate location of the intended passenger, the image being an image of the intended passenger or an image of local physical surroundings of the intended passenger, and processing the image to determine additional location information of the intended passenger based on matching the image against one or more reference images, the computer processing system being configured to accept the intended passenger responsive to the image processing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of non-limiting overview and as described in examples herein, the present systems and methods provide systems and methods for locating intended passengers of autonomous vehicles. For example, when a passenger requests a ride from an autonomous vehicle, e.g., using an application on the passenger's smartphone, that request may be relayed via a wireless network to a backend system which then relays the request to the vehicle via the wireless network. The request sent to the vehicle can include a location signal, such as a global positioning system (GPS) coordinate, corresponding to the approximate location of the intended passenger. This location signal allows the vehicle to arrive relatively close to the intended passenger's actual location (e.g., within 10 feet, within 20 feet, within 50 feet, etc.). However, the vehicle may not be able to find the passenger and/or the passenger may not be able to find the vehicle, for example, because there may be many vehicles and/or many humans in that approximate location. In some configurations, the intended passenger can capture a two-dimensional or three-dimensional image of immediately proximate streetscape structures such as buildings, landmarks, and the like, and transmit that image to the vehicle via the wireless network. The vehicle can use the image to identify and accept the passenger, e.g., by correlating the image to a reference image stored in an image database whose metadata is associated with a more specific location so as to more closely determine the intended passenger's actual location and then move to that location. Additionally, or alternatively, the intended passenger can display one or more signaling image(s) from his or her smartphone, such as a predetermined color, pattern, light-flashing pattern, or sequence of colors and hold it up for imaging by the vehicle such that the vehicle can recognize the predetermined signaling image(s) and accept the passenger (e.g., from amongst a group of humans) by obtaining and processing the acquired signal image(s) provided by the passenger.

Figure 1:
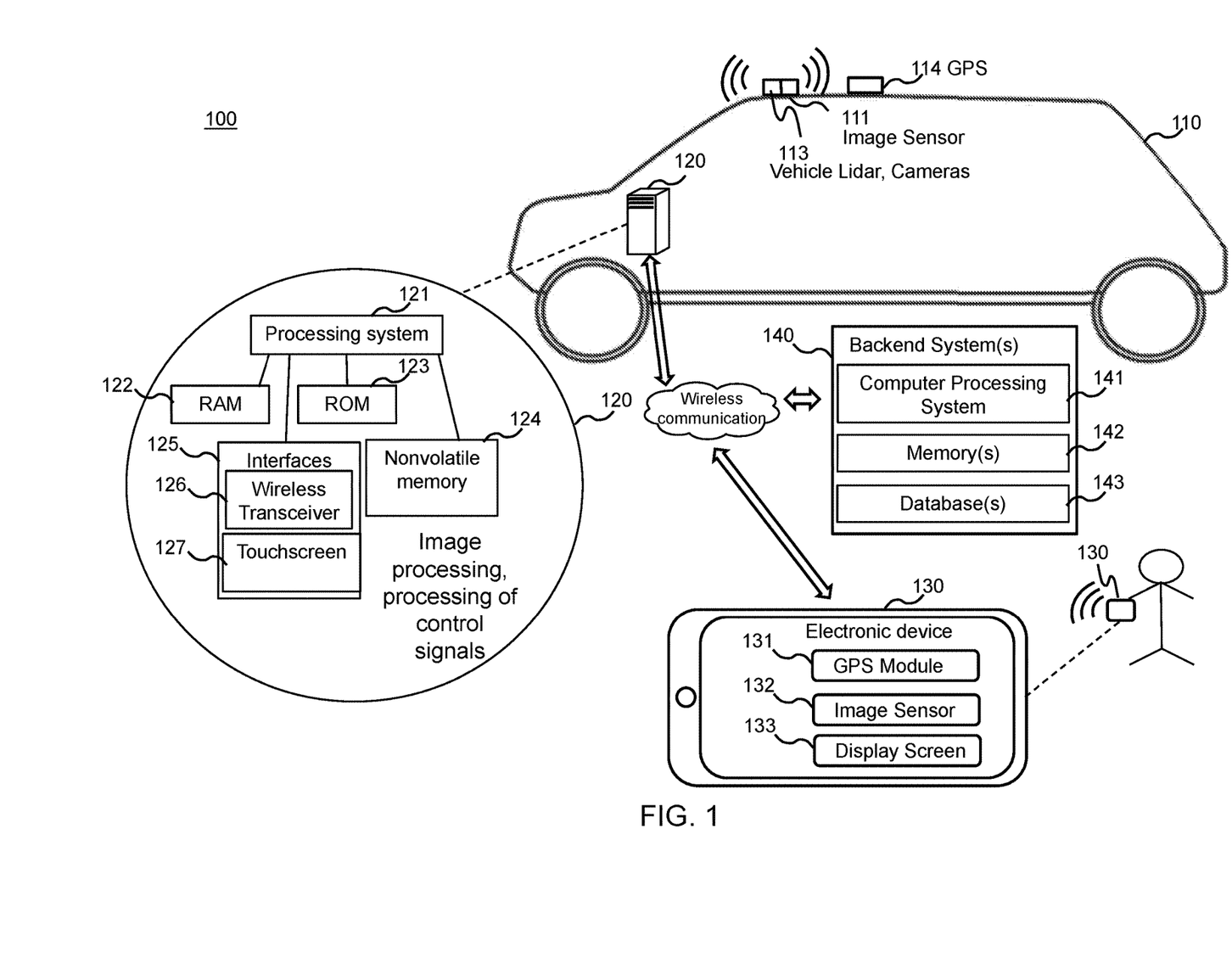
FIG. 1 is a block diagram in partial schematic form of an illustrative framework for an approach of locating an intended passenger of an autonomous vehicle.

FIG. 1 illustrates an illustrative framework 100 for an approach of locating an intended passenger of an autonomous vehicle according to examples of the disclosure. The framework 100 includes a vehicle 110 including an image processing and control system 120 and optionally also including an image sensor 111, an electronic device 130, and backend system(s) 140. The image processing and control system 120 can be configured so as to wirelessly communicate with the electronic device 130 via the backend system(s) 140 and the wireless network, and to control the vehicle 110 based thereon. The electronic device 130 can include a smartphone 130 from which the image processing and control system 120 can receive images and/or signals indicative of the intended passenger's location and/or physical surroundings, and can take appropriate actions based upon such signals and images such as described in greater detail herein. In some configurations, the vehicle is an autonomous vehicle, such as a level 4 or level 5 autonomous vehicle. However, it should be appreciated that the present systems and methods suitably can be used in any type of vehicle, including level 0 vehicles, level 1 vehicles, level 2 vehicles, level 3 vehicles, level 4 vehicles, and/or level 5 vehicles, as well as vehicles that use different categories of automation, are fully non-automated, or have any suitable level of automation.

An autonomous vehicle can be configured with an array of sensors, including LIDAR (light detection and ranging) and camera systems 113 for acquiring real-time video imagery of obstacles and other vehicles, GPS (global positioning system) 114, wireless communication systems for sending and receiving communications regarding road information and traffic in real-time, as well as a computer for applying driving rules and making driving decisions based on data and information acquired from the foregoing, in a suitable manner such as conventionally known in the art.

In the example illustrated in FIG. 1, the image processing and control system 120 includes a processing system 121, e.g., one or more central processing units (CPUs) and one or more memories utilized by the processing system 121, such as random access memory (RAM) 122, random online memory (ROM) 123, and/or nonvolatile memory 124, as well as interfaces 125 via which the vehicle can communicate with the occupant, the electronic device 130, and/or the backend system(s) 140. Nonvolatile memory 124 can include one or more software modules configured to cause the processing system 121 to perform one or more operations such as provided herein. For example, nonvolatile memory 124 can include program instructions configured to cause the processing system 121 to process one or more local streetscape or landscape images received from the intended passenger of the vehicle 110 via signals received via a wireless transceiver 126.

The local image(s) received from the intended passenger may then be processed by image processing at the processing system 121 or at a processing system 141 of the backend system 140 to match the image with one associated with specific location metadata. Suitable image processing known in the art for this purpose will be described further herein.

Using that specific location derived from known image metadata, the processing system 121 may take one or more actions, such as guiding the vehicle 110 to the intended passenger's specific location, optionally signaling to the intended passenger the vehicle's arrival and sending the intended passenger a picture of the vehicle 110, e.g., via text messaging or via the mobile app used by the intended passenger to request the vehicle 110. The vehicle 110 may then accept the passenger based upon any suitable means of authentication of the passenger by the vehicle 110. For example, the vehicle processing system 121 may take an image of the person believed to be the intended passenger and then carry out image processing of that image for comparison against a known image of the intended passenger (e.g., provided by the mobile app the intended passenger used to request the vehicle 110) to determine that a particular human is the intended passenger. Suitable image processing known in the art for this purpose will be described further herein. Alternatively, the intended passenger may be prompted using his electronic device to enter a predetermined code at a touchscreen or touchpad at an exterior surface of the vehicle 110 that is recognized by the vehicle 110.

In the configuration illustrated in FIG. 1, the image processing and control system 120 includes the wireless transceiver 126 and the GPS unit 114. The wireless transceiver 126 can be configured to connect to the electronic device 130 of the intended passenger and/or to the backend system(s) 140 via wireless communication. For example, the wireless transceiver 126 can include a cellular transceiver configured to provide communication between the vehicle 110 and the electronic device 130 of the intended passenger and/or to the backend system(s) 140 via a cellular connection. The wireless transceiver 126 may also include a Bluetooth transceiver configured to permit communication with the electronic device 130 via a Bluetooth connection, and/or a Wi-Fi transceiver configured to permit communication with the electronic device 130 and/or to the backend system(s) 140 via a Wi-Fi connection. The GPS unit 114 can be configured so as to obtain the GPS location of the vehicle 110, e.g., based on signals from respective GPS satellites.

The backend system(s) 140 can be used to control a pool of autonomous vehicles of which the vehicle 110 is a member (other vehicles of pool not specifically illustrated). The vehicle 110 can interact with the backend system(s) 140 hosted on one or more computer servers through a wireless communication network. The computer processing system 141 of the backend system(s) 140 can execute software operations, program instructions or routines to implement calculations and analyses such as provided herein. Such program instructions, accumulated data, and processed data may be stored one or more non-transitory computer-readable memories 142 and/or one or more data stores (such as an image repository) in databases 143. Communications may be carried out according to a client server architecture whereby passenger electronic devices 130 and autonomous vehicles 110 can access the remote monitoring backend system 140 via one or more servers via one or more wireless and/or wired communication networks.

For example, as noted above, a passenger can request an autonomous vehicle using a suitable application on his or her electronic device 130, such as a smartphone. The request can include a location signal, such as the passenger's current GPS coordinate provided by a GPS module 131 of the electronic device 130, and can be sent via the wireless network to the backend system(s) 140 which control the pool of autonomous vehicles. The computer processing system 141 of the backend system(s) 140 is configured so as to process the request, e.g., responsive to suitable instructions stored in memory 142, and to send a signal via the wireless network to the vehicle 110 providing the location signal to the vehicle for use in locating the intended passenger.

The wireless transceiver 126 of vehicle-based image processing and control system 120 is configured to receive the location signal (e.g., GPS coordinate) via the wireless network. A processing system such as the processing system 121 can then process the location signal and provide guidance control to move the vehicle 110 to that location of the intended passenger based on the location signal. For example, the processing system 121 may be configured to compare the current GPS coordinate of the vehicle to the GPS coordinate of the intended passenger and control the movement of the vehicle to the GPS coordinate of the intended passenger along a suitable route using the LIDAR and camera systems 113, the GPS unit 114, and high definition maps as known in the art. However, the passenger's GPS coordinate (or other location signal or location data) received by the vehicle 110 may not exactly correspond to the intended passenger's precise location when the vehicle 110 arrives relatively close to the intended passenger. For example, the intended passenger may have physically moved during the time between when he or she requested the vehicle and when the vehicle arrives. Additionally, or alternatively, the GPS coordinate (or other location signal) received by the vehicle 110 may have been inaccurate or its precision may have been limited due to other factors, such as proximity to tall buildings and the like. Additionally, or alternatively, even if the passenger's GPS coordinate may be accurate and even if the vehicle can reach the passenger's approximate location, the GPS coordinate alone may not provide sufficient information for the vehicle to locate the intended passenger.

As provided herein, the use and transmission of certain images can assist the vehicle 110 in locating its intended passenger. More specifically, the computer processing system 121 at the vehicle 110 and/or the computer processing system 141 at the backend system 140 may can be configured to receive a local streetscape image or landscape image taken by the electronic device 130 at the intended passenger's precise location after the vehicle is moved to the approximate location of the intended passenger, and image processing can be carried out on that image to more precisely identify the intended passenger's location and move the vehicle 110 to the precise location of the intended passenger responsive to receiving the image. For example, in some configurations the application with which the passenger requested the vehicle prompts the passenger to take an image of the intended passenger's physical surroundings. The image sensor 132 of the electronic device 130 obtains the image and transmits the image to the transceiver 126 of vehicle 110 via the wireless network, optionally via the backend system(s) 140. Image processing carried out by the computer processing system 121 can correlate the view (within the received image) to a reference image stored in an image database for which location metadata is known and provides a precise location for the landscape or streetscape view.

For example, databases 143 can include a database storing a repository of reference images with associated location metadata (such as GPS coordinates and/or street addresses) corresponding to such images. The vehicle can use correlations between the reference images and images obtained from the intended passenger's smartphone to identify the passenger's actual location and accept him or her. For example, the computer processing system 121 and/or 141, programmed with program instructions, may be configured to submit a query, via the wireless network, to the image database 143 of the backend system(s) 140 to identify a reference image corresponding to the view within the received image. Alternatively, the image processing and control system 120 can store such repository locally, e.g., within ROM 123 or nonvolatile memory 124, and suitably query the repository without the need to access the backend system(s) 140. The approximate location of the passenger, known from GPS coordinates and/or wireless communication triangulation, is communicated to the processing system 121 and/or 141. With this approximate location information known, only a relatively small collection of database images, which are tagged with geolocation metadata, need to undergo image processing to more accurately identify the location of the passenger. In this regard, image data of outdoor scenery whose geolocation metadata correspond to locations with a predetermined variance (radius) of the approximate location of the passenger (e.g., from GPS coordinates of the passenger's smart phone when the passenger took the image) may be identified from a database(s) of image data of outdoor scenery for image processing analysis to search for a match between the image the passenger took and image data of the selected scenery images whose geolocation metadata falls within the predetermined distance. Image processing techniques are known in the art for matching one image to another image from a database of images, and any suitable technique(s) for such matching may be used to carry out this aspect of the disclosure. For example, image processing using Scale Invariant Feature Transform (SIFT), Speeded-Up Robust Features (SURF), and Features from Accelerated Segment Test (FAST), which are known in the art, may be used in this regard, such as discussed in the following articles, the entire contents of which are incorporated herein by reference: Lowe, "Object recognition from local scale-invariant features," Proceedings of the International Conference on Computer Vision, 1999, pp. 1150-1157; Bay et al., "Speeded-Up Robust Features (SURF)," Comput. Vis. Image Understand., vol. 110, no. 3, pp. 346-359, June 2008; Rosten et al., "Machine Learning for High-Speed Corner Detection, European Conference on Computer Vision, ECCV 2006: Computer Vision, pp. 430-443. Additional image processing methods that may be applicable are noted in "A Survey On Image Matching Methods," Krishnan et al., International Journal of Latest Research in Engineering and Technology (IJLRET), January 2016, pp. 58-61, the entire contents of which are incorporated herein by reference. It should be understood that the image data in the database(s) of image data of outdoor scenery need not necessarily be stored as pixelated images, and such image data may be already be vectorized or otherwise preprocessed in any suitable way to as to facilitate efficient and speedy image processing of matching the image taken by the passenger to image data identified as being within the location variance (radius) of the passenger's location, depending upon the image processing approach utilized.

As another example, transforming the image using a suitable transformation, such as zero-centering the pixel data or image normalization so the image obtained by the passenger's smartphone is substantially unaffected by temporal lighting conditions that differ from the reference images in the backend system(s), and performing a query against the database of images based on the transformed image using deep learning and neural networks may be used. For example, the passenger's query image can be processed by a deep neural network that is part of the backend system(s) which has been trained to detect landmarks found in the database(s) of reference image data whose geolocation metadata corresponds to locations within the predetermined variance of the passenger's smartphone location. Examples of such landmarks can be building facades, vegetation, street signs, traffic signals, statues, etc., and combinations thereof. One or more landmarks may be detected in the passenger's query image using the deep neural network and matched to image data of known geolocation to identify a more accurate position for the passenger. Detailed implementations of examples of convolutional neural network systems for identifying matching image data, and which may be utilized for such purpose in the methods disclosed herein, are described in the following references, the entire contents of each of which are incorporated by reference herein: Weyand et al., "PlaNeT: Photo Geolocation with Convolutional Neural Networks, in Leibe et al. (Eds.), Computer Vision—EECV 2016, Part VIII, Lecture Notes in Computer Science 9912, pp. 37-55 (Springer, 2016); Arandjelović et al., "NetVLAD: CNN architecture for weakly supervised place recognition," 2016 IEEE Conference on Computer Vision and Pattern Recognition (CVPR), Las Vegas, Nev., pp. 5297-5307 (2016); and Arandjelović et al., "NetVLAD: CNN architecture for weakly supervised place recognition," arXiv: 1511.07247v3 [cs.CV] 2 May 2016, 17 pages (obtained from https://arxiv.org/abs/1511.07247). It will be appreciated that such approaches may involve training a convolutional neural network (CNN) architecture using a large reference database of outdoor scene images (place images) such as obtained with Google Street View Time Machine and/or other sources. Such reference image data may associate multiple place images for the same location wherein the multiple images of the same place are taken, e.g., at different times of day, from different perspectives and distances, and with different amounts of collateral clutter (automobiles, pedestrians, etc.). Such images may be vectorized, such as known in the art and as described in the referenced articles above, and the CNN may be trained against known training query images, such as described in the articles referenced above, to enable the CNN to match actual query images to image data of the reference database (s).

Where multiple landmarks are detected in the query image taken by the passenger, the relative location of those landmarks to one another in the query image can be processed by the processing system 121 and/or 141 to determine an accurate position of the passenger's smartphone. For example, the accurate geolocations of the detected/matched landmarks are known, and the sizes (e.g., heights and/or widths, etc.) of the detected/matched landmarks may also be known. In such case, the relative sizes and orientations of those landmarks in the passenger's query image can undergo further image processing by the processing system 121 and/or 141 according to three-dimensional geometrical principles to identify the originating point of the passenger's query image as indicative of the location of the passenger's smartphone. Estimation of camera position of the user's smartphone can be determined by virtue of analyzing by the processing system 121 and/or 141 a previously created map of the relevant area proximate to the smartphone's geolocation, the map being based on previously captured features from images that have been previously scanned and for which the location of individual landmark features are known in three dimensions (3D). The processing system 121 and/or 141 may then carry out a matching analysis on the image captured by the passenger to determine the best alignment of known features from the passenger's smartphone image to the known features of the previously constructed 3D map of the local area, e.g., by carrying out iterative incremental rotations of the 3D map to generate projections that can be compared to the image acquired by the passenger. An image projection from the 3D map that minimizes differences in locations of known landmark features relative to the image taken by the passenger (e.g., determined by feature detection analysis image comparison) is correlated to a camera position within the known 3D map to identify the location of the passenger's smartphone camera in the known 3D environment for the picture taken by the passenger. In this regard, scaling of the image projections generated from the known 3D map can be used to estimate distance of the camera position within the known 3D map. The smartphone functionality which takes the picture acquired by the passenger for this purpose can automatically be set to take the passenger picture without any magnification to facilitate such image analysis to avoid any magnification artifacts that might otherwise complicate the analysis. Distances to known landmark features of known size and/or separation (e.g., known distance between two or more known landmark features) may also be estimated by the processing system 121 and/or 141 by virtue of prior known camera calibrations for a given smartphone camera, whereby, e.g., for images taken at no additional magnification, a known object width or height (e.g., a known distance between known landmark features) will correlate to a specific pixel separation on the image sensor of the smartphone camera at a given distance from the object. The detected pixel separation on the image sensor of the smartphone camera between landmark features of known separation can therefore be used to estimate camera distance to the known landmark features based on such known correlations for the particular camera of the given smartphone. Such information can be readily retrieved from calibration tables previously prepared for various cameras of various smartphones.

Thus, responsive to the query, the processing system 121 and/or 141 correlates the view within the received image to reference image data, the reference image data having known geolocation information. Notably, the search of the image database need not be voluminous because the approximate location of the intended passenger is already known as mentioned above, e.g., from the GPS location of the passenger's smartphone that took the query image. Thus, only reference images in the database having approximate locations within a predetermined variance of the intended passenger's approximate location need be searched. This provides for increased speed of image processing and lessens the requirements on computing resources and bandwidth.

Having identified the more precise location of the intended passenger based on the image processing, the computer processing system 121 can execute steps to accept the intended passenger based on the correlation between images. For example, based on the correlation, the processing system 121 can cause the vehicle 110 to move to a more precise location near to the intended passenger's actual location (e.g., within two feet, five feet, ten feet, 20 feet, etc., of the intended passenger's actual location or as close to such location as the roads may allow) and to open the vehicle door to allow the passenger to enter the vehicle.

As another alternative, which can be used alone or in combination with one or more other options provided herein, imagery received by the vehicle 110 (e.g., via wireless communication) can include a first view of the intended passenger himself or herself. For example, in some configurations the application with which the passenger requested the vehicle prompts the passenger to take an image of himself or herself. The image sensor 132 of the electronic device 130 obtains the image and transmits the image to transceiver the 126 of the vehicle 110 via the wireless network, optionally via the backend system(s) 140. The vehicle 110 can include the image sensor 111 configured to obtain a second view of the intended passenger. For example, the processing system 121 can control the image sensor 111 to obtain one or more images of the approximate location of the intended passenger, at least one of such images including a view of the intended passenger. The processing system 121 can then correlate the first view and the second view to identify the intended passenger and guide the vehicle to the intended passenger's precise location. In this regard, positional sensors and directional sensors associated with the vehicle's camera system and guidance system can determine the location of the imaged passenger based on the known orientation and location of the vehicle and based on the known orientation and LIDAR data associated with the image taken that corresponds to the image received from the intended passenger. Having determined the intended passenger's precise location based on the correlation of images, the processing system 121 is configured to thereafter accept the passenger based on the correlation. For example, based on the correlation, the processing system 121 can cause the vehicle 110 to move to a location near to the intended passenger's precise location (e.g., within two feet, five feet, ten feet, 20 feet, etc., of the intended passenger's actual location or as close to such location as the roads may allow) and to open the vehicle door to allow the passenger to enter the vehicle.

As still another alternative, which can be used alone or in combination with one or more other options provided herein, the intended passenger's electronic device can be used so as to generate one or more images that the vehicle 110 can use to locate the passenger. For example, imagery can be displayed by a display screen 133 of the electronic device, and the vehicle 110 can include the image sensor 111 configured to receive the image from the electronic device by obtaining an image of that image. For example, the processing system 121 can transmit an image request signal to the electronic device 130 via the transceiver 126 and the wireless network (and optionally also the backend system(s) 140) to display predetermined imagery (e.g., the processing system 121 and/or 141 may provide the predetermined imagery itself to the electronic device 130), and the electronic device 130 may then display the imagery responsive to the image request signal. The imagery can include, for example, a selected color, a selected pattern, a flashing light pattern, or a selected sequence of colors, or any other image that can be used to uniquely identify the electronic device 130 as belonging to the intended passenger. In association with the image request, the image sensor 111 may acquire the imagery, and the processing system 121 may process the imagery to confirm it is the same as the predetermined imagery, thereby precisely locating the intended passenger.

In some configurations, responsive to the image request signal, the application that the passenger used to request the vehicle can prompt the intended passenger to hold up the electronic device 130 in such a manner that the imagery displayed on the display screen 133 of the device can be imaged by the image sensor 111 of the vehicle 110. Image processing carried out by the processing system 121 compares the image that the image sensor 111 obtained of the image displayed on the display screen 133 to the information about the image that was obtained in association with the image request. In response to a match between the image and the information, the processing system 121 makes a determination to accept the passenger.

In any such approaches, the vehicle may then accept the passenger based upon any suitable means of authentication of the passenger by the vehicle 110. For example, the vehicle processing system 121 may take an image of the person believed to be the intended passenger and then carry out image processing of that image for comparison against a known image of the intended passenger (e.g., provided by the mobile app the intended passenger used to request the vehicle 110) to determine that a particular human is the intended passenger. Suitable image processing known in the art for this purpose was mentioned above such as, e.g., Scale Invariant Feature Transform (SIFT), Speeded-Up Robust Features (SURF), and Features from Accelerated Segment Test (FAST).

Alternatively, the intended passenger may be prompted using his or her electronic device 130 to enter a predetermined code at a touchscreen or touchpad at an exterior surface of the vehicle 110 that the vehicle recognizes for authentication. Upon authentication, the processing system 121 and/or 141 may unlock the vehicle 110 permit access for the intended passenger.

Figure 2:
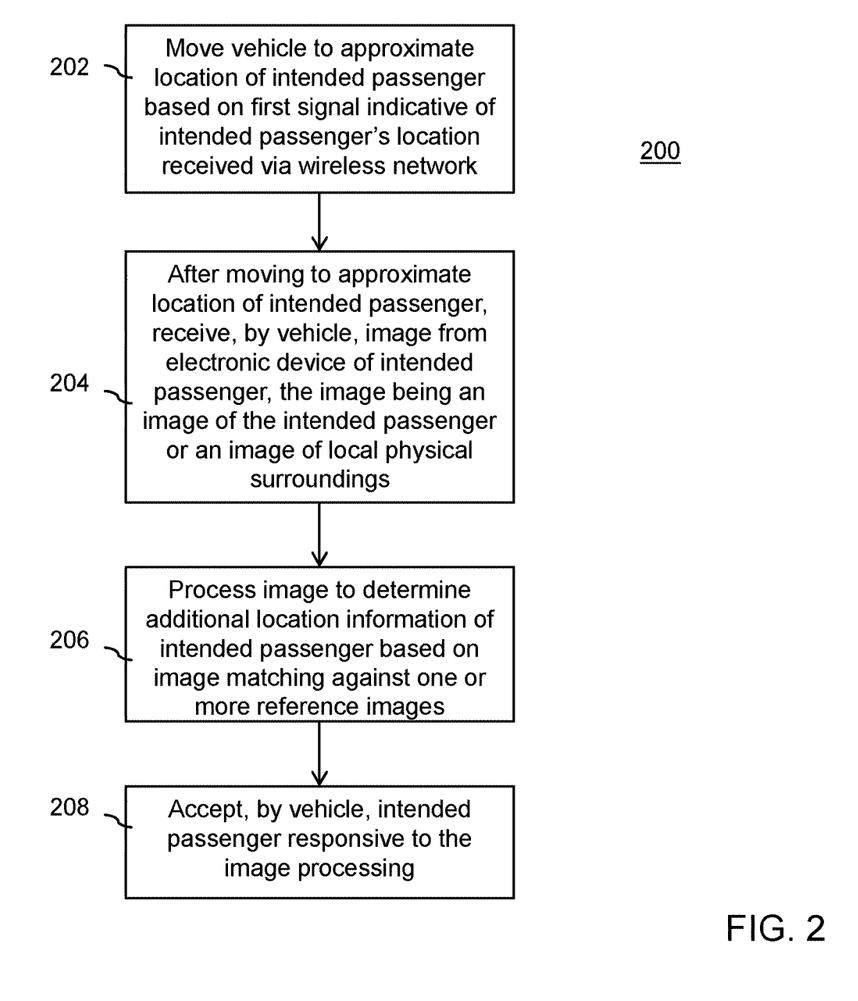
FIG. 2 is a flow chart of an illustrative method of locating an intended passenger of an autonomous vehicle.

FIG. 2 illustrates a flow chart of an illustrative method 200 of locating an intended passenger of an autonomous vehicle, according to examples of the disclosure. It should be appreciated that although operations of the method 200 as illustrated in FIG. 2 are described with reference to the framework 100 illustrated in FIG. 1, such operations suitably can be used with any appropriate combination of hardware and software, e.g., any non-autonomous or autonomous vehicle.

The method 200 illustrated in FIG. 2 includes at a block 202 moving, by the vehicle, to an approximate location of the intended passenger based on a location signal received via a wireless network. For example, responsive to a vehicle request that includes the location signal and may be generated at the electronic device 130 and processed through the wireless network and the optional backend system(s) 140 such as illustrated in FIG. 1, vehicle 110 can move to an approximate location of the intended passenger, such as described previously herein.

Referring again to FIG. 2, the method 200 can include at a block 204, after moving to the approximate location of the intended passenger, receiving, by the vehicle, an image from an electronic device of the intended passenger wherein the image is indicative of the local physical surroundings, e.g., local streetscape or landscape of the intended passenger. As described in greater detail with reference to FIG. 1, the vehicle 110 can receive any suitable combination of images from the electronic device 130 via any suitable modes of communication. For example, the image can be obtained by the imaging sensor 132 of the electronic device 130 and received by the vehicle 110 via the wireless network. The image can include a view of the intended passenger's physical surroundings or a view of the intended passenger that the vehicle receives via the wireless network, and/or can be displayed by the electronic device 130 and received by the vehicle via the image sensor 111. Any suitable number and types of such images suitably can be used in combination with one another.

The method 200 may also include at a block 206, processing the image to determine additional location information of the intended passenger, e.g., a more precise location of the intended passenger, based on image matching the image against an image database containing images associated with location metadata. Illustrative image processing approaches for carrying out the image matching were noted previously herein.

Referring to FIG. 2, the method 200 can include at a block 208 accepting, by the vehicle, the intended passenger responsive to receiving the image (206). For example, in some configurations the vehicle 110 accepts the passenger based on a correlation between the view of the intended passenger's physical surroundings and a location corresponding to a reference image stored in an image database and/or based on a correlation between the view of the intended passenger and view of the intended passenger obtained using the image sensor 111 of the vehicle. Additionally, or alternatively, the image can include a selected color, a selected pattern, selected flashing light pattern, or a selected sequence of colors that is broadcast by the display device 133 of the electronic device 130, and the vehicle 110 accepts the passenger based on a match between the broadcast image and information that the vehicle 110 has regarding the image that the electronic device 130 is expected to display, such as described previously herein. The vehicle's acceptance of the passenger further can involve other exchange of information by a variety of means. For example, passenger acceptance may include exchange of an unlock code sent by the vehicle to the intended passenger by text message or popup message on the smartphone app that provide the functionality described herein, which the user may accept by any suitable finger swipe or press in order to open the door of the vehicle. Acceptance of the passenger may involve an audible message spoken to the intended passenger by the automated voice technology of the vehicle by which the user may confirm that the vehicle is in fact the proper vehicle destined for that intended passenger. Any other suitable means of exchanging information to confirm and accept the passenger may also be used.

This written description describes illustrative embodiments, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

In various embodiments, a non-transitory computer readable medium for carrying out the illustrative approach may include program instructions adapted to cause a computer processing system to execute the above-mentioned steps. The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present disclosure has been described in terms of illustrative embodiments, it will be understood by those skilled in the art that various modifications can be made thereto without departing from the scope of the claimed subject matter as set forth in the claims.

What is claimed is:

1. A method of locating an intended passenger of an automotive vehicle, the method comprising:
    causing, by a processor, the vehicle to move to an approximate location of an intended passenger based on a location signal from the intended passenger received via a wireless network;
    prompting, by the processor, the intended passenger to obtain an image using an electronic device after the vehicle reaches the approximate location of the intended passenger, the image being an image of local physical surroundings of the intended passenger;
    receiving, by the processor, the image from the electronic device of the intended passenger;
    processing, by the processor, the image to determine additional location information of the intended passenger based on matching the image against one or more reference images selected based on a proximity of the one or more reference images to the location signal from the intended passenger; and based on the determined additional location information, causing, by the processor, the vehicle to move to a more accurate location of the intended passenger.

2. The method of claim 1, wherein the image is obtained by an imaging sensor of the electronic device and is received by the vehicle via the wireless network.

3. The method of claim 1, wherein the image includes a view of the local streetscape or local landscape at the intended passenger's location.

4. The method of claim 1, further comprising accepting, by the processor, the intended passenger responsive to the image processing, wherein the processor accepts the passenger based on a correlation between the image from the intended passenger and a reference image associated with location metadata stored in an image database.

5. The method of claim 1, wherein the image includes a first view of the intended passenger.

6. The method of claim 5, further comprising, by the processor, obtaining a second view of the intended passenger using an image sensor of the vehicle, wherein the processor accepts the passenger based on a correlation between the first view and the second view.

7. The method of claim 1, wherein:
an identifying image is displayed by a display screen of the electronic device; and
the vehicle receives the identifying image by using an image sensor of the vehicle to obtain an image of that identifying image.

8. The method of claim 7, wherein:
the vehicle transmits an image request signal to the electronic device via the wireless network; and
the electronic device generates the identifying image responsive to the image request signal.

9. The method of claim 7, wherein the identifying image includes a selected color, a selected pattern, a selected light-flash pattern, or a selected sequence of colors.

10. The method of claim 1, wherein the location signal includes a global positioning system (GPS) coordinate of the intended passenger.

11. A vehicle-based system for locating an intended passenger of an automotive vehicle, the system comprising:
a wireless transceiver configured to receive a location signal via a wireless network;
an image sensor for acquiring imagery proximate the vehicle;
a navigation system for providing guidance for moving the vehicle to an approximate location of the intended passenger based on the location signal; and
a computer processing system configured to prompt the intended passenger to obtain an image using an electronic device after the vehicle reaches the approximate location of the intended passenger, the image being an image of local physical surroundings of the intended passenger, receive the image from the electronic device of the intended passenger, processing the image to determine additional location information of the intended passenger based on matching the image against one or more reference images selected based on a proximity of the one or more reference images to the location signal, and moving the vehicle to a more accurate location of the intended passenger based on the additional location information.

12. The system of claim 11, wherein the image is obtained by an imaging sensor of the electronic device and is received by the transceiver via the wireless network.

13. The system of claim 11, wherein the image includes a view of the intended passenger's local streetscape or local landscape.

14. The system of claim 11, wherein:
the computer processing system is configured to correlate the view and a location corresponding to a reference image stored in an image database; and
the computer processing system is configured to accept the passenger based on the correlation.

15. The system of claim 11, wherein the image includes a first view of the intended passenger.

16. The system of claim 15, wherein:
the image sensor is configured to obtain a second view of the intended passenger;
the processing system is configured to correlate the first view and the second view; and
the processing system is configured to accept the passenger based on the correlation.

17. The system of claim 11, wherein:
an identifying image is displayed by a display screen of the electronic device; and
the image sensor is configured to acquire an image of the identifying image displayed on the display screen of the electronic device.

18. The system of claim 17, wherein:
the processing system is configured to cause transmission of an image request signal to the electronic device via the transceiver and the wireless network; and
the electronic device generates the identifying image responsive to the image request signal.

19. The system of claim 17, wherein the identifying image includes a selected color, a selected pattern, a selected light-flash pattern, or a selected sequence of colors.

20. The system of claim 11, wherein the location signal includes a global positioning system (GPS) coordinate of the intended passenger.

* * * * *